United States Patent [19]

Böhm et al.

[11] 4,218,679
[45] Aug. 19, 1980

[54] AIRBORNE OR GROUND STATION FOR A RADIO NAVIGATION SYSTEM AND PARTICULARLY A DME SYSTEM

[75] Inventors: Manfred Böhm; Günther Peuker, both of Stuttgart, Fed. Rep. of Germany

[73] Assignee: International Standard Electric Corporation, New York, N.Y.

[21] Appl. No.: 956,553

[22] Filed: Nov. 1, 1978

[30] Foreign Application Priority Data

Nov. 4, 1977 [DE] Fed. Rep. of Germany ....... 2749406

[51] Int. Cl.² .............................................. G01S 9/56
[52] U.S. Cl. ............................ 343/6.5 R; 343/17.2 R
[58] Field of Search ....................... 343/6.5 R, 17.2 R

[56] References Cited

U.S. PATENT DOCUMENTS

| | | | |
|---|---|---|---|
| 2,890,449 | 6/1959 | Pickles et al. | 343/6.5 R |
| 3,648,177 | 3/1972 | Himmel | 343/17.2 R X |
| 4,003,049 | 1/1977 | Sterzer et al. | 343/6.5 R X |
| 4,072,946 | 2/1978 | Kneefel | 343/6.5 R X |

*Primary Examiner*—T. H. Tubbesing
*Attorney, Agent, or Firm*—John T. O'Halloran; Peter C. Van Der Sluys

[57] ABSTRACT

With the increase in air traffic, it has become increasingly important to transmit more information (e.g. addresses, position data, altitude and angle values) between aircraft and ground. This is done by modulating the phase of the carrier wave of DME or TACAN signals, the phase modulation being so chosen in the invention that the predetermined bandwidth of a DME/TACAN channel is not exceeded as a result of the phase modulation. In this way, full compatibility with existing DME or TACAN systems is achieved.

2 Claims, 2 Drawing Figures

AIRBORNE OR GROUND STATION FOR A RADIO NAVIGATION SYSTEM AND PARTICULARLY A DME SYSTEM

BACKGROUND OF THE INVENTION

The present invention relates to an airborne or ground station. An airborne or ground station of this kind is known from German Published Patent Application (DT-OS) 2,038,982. DME and TACAN airborne or ground stations per se are described in a book by E. Kramar, "Funksysteme für Ortung und Navigation", published by Berliner Union GmbH, Stuttgart 1973, pages 147 to 169.

In DT-OS 2,038,982, a direction finder co-located with the DME transponder determines the angle of arrival of the DME interrogation signal, and this angle value is transmitted together with the DME reply signal to the interrogator in coded form. As possible coding methods, the application proposes phase modulation, amplitude modulation or pulse-spacing modulation. With pulse-spacing modulation, the angle information is contained in the space between an additional pulse pair and the DME reply pulse pair. That proposal has been implemented in the new microwave landing system DLS, which is generally known from the literature.

Consideration has also been given to the possibility of implementing the information transmission by modulating the phase of the carrier wave of the pulses. In the known phase modulations, however, the predetermined bandwidth of a DME/TACAN channel is exceeded, so it is not permissible in the existing systems. The bandwidth is laid down by, e.g., the "International Standards and Recommended Practices, Aeronautical Telecommunications, Annex 10 to the Convention on International Civil Aviation". Thus, the known phase modulation will only be applicable in new navigation systems whose bandwidths have not been fixed yet.

OBJECT

The object of the invention is to provide such a phase modulation of the RF carrier wave of a pulse wherein the predetermined bandwidth is not exceeded.

SOLUTION

This object is achieved by the use of a control unit and phase modulator which modulates the phase of the r.f. carrier so that the shape of the curve of the phase deviation of the phase-modulated wave relative to the unmodulated wave as a function of time is approximately equal in shape to the curve of the pulse amplitude as a function of time as illustrated in FIG. 2. The phase modulator is controlled so that phase modulation begins and ends at about the times when the pulse amplitude reaches half the maximum value.

ADVANTAGES

With the increasing air traffic, it has become increasingly important to transmit more information between aircraft and ground. This is made possible by the phase modulation according to the invention. The information to be transmitted may be, for example, data (angle values, position data, altitude values), instructions to the pilot, or addresses. The novel phase modulation is relatively insusceptible to multipath transmission interference.

DESCRIPTION OF THE INVENTION

The invention will now be explained in more detail and by way of example with reference to the accompanying drawings, in which.

Figure 1:
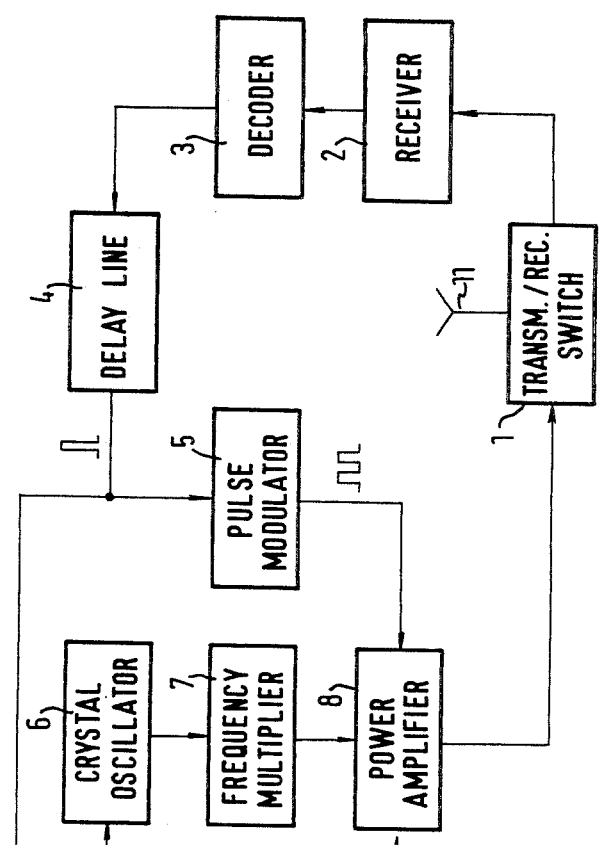
FIG. 1 is a block diagram of a novel ground station.

The block diagram of FIG. 1 shows the known parts of a DME transponder on the right-hand side A, and the novel parts on the left-hand side B.

In the known DME transponder, the DME interrogation signal is received by an antenna 11 and applied via a transmit/receive switch 1 to a receiver 2. A decoder 3 checks whether the received pulses have the prescribed spacing, and, if the result is positive, passes the pulses on to a delay line 4. The time at which the radiation of the reply signal takes place is derived from the received pulse pair, the reply signal consisting of a pulse pair, too. Preferably, the trigger time is derived from the—possibly delayed—first pulse of a pulse pair. The trigger pulse controls a pulse modulator 5, which modulates the signal to be radiated. A power amplifier 8 is fed with the output signal of a crystal oscillator 6 via a frequency multiplier 7. The output signal of the power amplifier 8 is the reply signal consisting of a pair of pulses. It is applied via the transmit/receive switch 1 to the antenna 11 and radiated from there.

The known ground station outlined above is described in detail in the above-cited reference (book by E. Kramar).

In addition, the novel ground station includes a control unit 9 and a modulator 10. The modulator 10 is a phase modulator and may be of a known type such as a sine wave oscillator to provide a signal to the crystal oscillator 6 for modulating the phase of the signal generated by the oscillator 6.

The modulator 10 and its control will be described in the following. In addition to the trigger pulse, the information to be transmitted is fed to the control unit 9 in coded form. The digital information may consist of several binary values with the following assignment:

| Maximum phase deviation: | State |
|---|---|
| +45° present | 1 |
| +30° present | 2 |
| +15° present | 3 |

The number of digits may be increased by other phase modulations (e.g. negative phase deviations; phase modulation of the carrier of the second pulse of the pulse pair).

Figure 2:
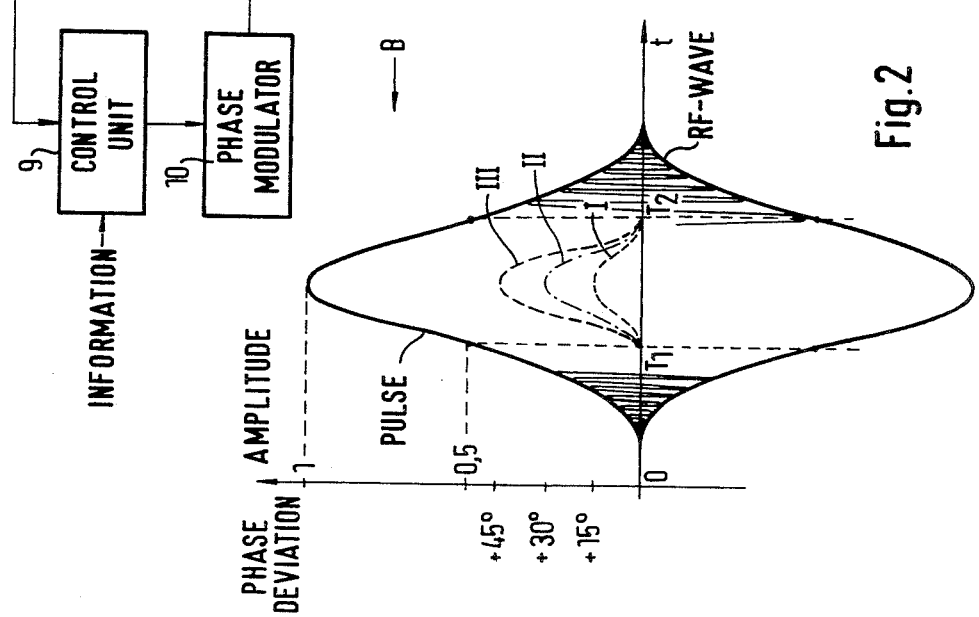
FIG. 2 is a diagram showing the amplitude characteristic of the pulses and the phase characteristic of the RF carrier wave of the pulses.

The information to be transmitted is assumed to be the state 1, e.g. "01". The control unit 9 then provides a control signal to the phase modulator 10 for controlling the modulator 10 so that the phase deviation of the output signal of the crystal oscillator 6 relative to the unmodulated wave assumes the shape of the curve III of FIG. 2. This curve is approximately equal in shape to the amplitude curve of the pulse (e.g. Gaussian shape, cosine shape). Thus, in response to the control signal, the phase modulator 10 provides a phase modulation signal to the crystal oscillator 6 for shifting the phase of the crystal oscillator signal by an amount so that the phase deviation between the phase-shifted signal and the non-phase-shifted signal would correspond to one of the curves I, II or III as shown in FIG. 2. As previously mentioned, the phase modulator 10 may be a sine wave oscillator which provides a signal that has the general shape of the Gaussian pulse provided by the power amplifier 8. The phase modulation begins approximately at the instant T1, where the leading edge of the pulse reaches half of its maximum value, and ends approximately at the instant T2, where the trailing edge reaches half of its maximum value. The beginning of the phase modulation is derived from the trigger pulse, and the duration—and, consequently, the end—is given by the predetermined pulse length.

The phase-modulated output signal of the crystal oscillator 6 or of the frequency multiplier 7 is amplitude-modulated by the pulse modulator 5, and amplified, in the power amplifier 8. As both the pulse modulator 5 and the control unit 9 for the phase modulator 10 are controlled by the same trigger pulse, the desired, above-described time relationship between amplitude modulation and phase modulation is obtained.

If the received signal has already been phase-modulated, the receiver will be supplemented by a phase detector and an evaluation device for evaluating the phase modulation. This is generally known and, therefore, will not be explained here in detail.

What is claimed is:

1. A station for a radio navigation system of the type that radiates a phase and pulse modulated ratio frequency signal, including:
   means for providing a trigger signal;
   means for providing the radio frequency signal including an oscillator means;
   means responsive to the trigger signal for pulse modulating the radio frequency signal to provide a pulse modulated signal having a predetermined pulse shape;
   means for transmitting said pulse modulated radio frequency signal;
   control means receiving said trigger signal and a signal corresponding to information to be transmitted, said means being responsive to said received signals for providing a control signal corresponding to the information to be transmitted; and
   phase modulating means responsive to the control signal for providing a phase modulation signal to the oscillator means, said phase modulation signal corresponding to the information to be transmitted and having a shape generally corresponding to the predetermined pulse shape, whereby the oscillator means is responsive to the phase modulation signal so that the radio frequency signal is phase modulated and the phase deviation of the phase-modulated radio frequency signal relative to the unmodulated radio frequency signal as a function of time approximately corresponds in shape to that of the pulse amplitude as a function of time.

2. A station for a radio navigation system such as a DME or TACAN system, which station radiates a phase and pulse modulated radio frequency signal, including:
   means for receiving an interrogation signal;
   means for decoding said interrogation signal and for providing said interrogation signal at an output if the interrogation signal meets predetermined conditions;
   means for delaying said interrogation signal provided at the output of said decoding means and for providing a trigger signal in response to said interrogation signal;
   means for providing the radio frequency signal including an oscillator means;
   amplifier means for amplifying said radio frequency signal;
   pulse modulating means responsive to the trigger signal for controlling the amplifier means to provide the pulse-modulated radio frequency signal having a predetermined shape;
   means to transmit said pulse modulated radio frequency signal;
   control means receiving said trigger signal and a signal corresponding to information to be transmitted and being responsive thereto for providing a control signal corresponding to the information to be transmitted; and
   phase modulating means responsive to the control signal for providing a phase modulation signal to the oscillator means, which phase modulation signal corresponds to the information to be transmitted and has a shape generally corresponding to the predetermined pulse shape, whereby the phase of the oscillator means is responsive to the phase modulation signal so that the radio frequency signal is phase modulated and the phase deviation of the phase modulated radio frequency signal relative to the unmodulated radio frequency signal as a function of time approximately corresponds in shape to that of the predetermined pulse shape.

* * * * *